(12) United States Patent
Maheshwari et al.

(10) Patent No.: US 8,320,431 B2
(45) Date of Patent: Nov. 27, 2012

(54) DIFFERENTIAL CHANNEL QUALITY REPORTING

(75) Inventors: Shashikant Maheshwari, Irving, TX (US); Adrian Boariu, Irving, TX (US)

(73) Assignee: Nokia Siemens Networks Oy, Espoo (FI)

( * ) Notice: Subject to any disclaimer, the term of this patent is extended or adjusted under 35 U.S.C. 154(b) by 1093 days.

(21) Appl. No.: 12/201,651

(22) Filed: Aug. 29, 2008

(65) Prior Publication Data

US 2009/0060010 A1    Mar. 5, 2009

Related U.S. Application Data

(60) Provisional application No. 60/969,469, filed on Aug. 31, 2007.

(51) Int. Cl.
*H04L 25/20* (2006.01)
(52) U.S. Cl. ........ 375/211; 375/220; 375/340; 370/252; 370/278; 370/501; 455/7; 455/13.1; 455/67.11
(58) Field of Classification Search .................. 375/141, 375/144, 148, 211, 220, 221, 340, 346; 370/252, 370/278, 282, 284, 315, 317, 318, 322, 329, 370/348, 437, 464, 465, 492, 501; 455/7, 455/9, 13.1, 13.4, 24, 509, 513, 517, 67.11, 455/67.13, 132, 134, 135, 226.1–226.4
See application file for complete search history.

(56) References Cited

U.S. PATENT DOCUMENTS

| | | | |
|---|---|---|---|
| 7,574,179 B2 * | 8/2009 | Barak et al. | 455/101 |
| 7,813,695 B2 * | 10/2010 | Haartsen | 455/11.1 |
| 7,848,295 B2 * | 12/2010 | Kang et al. | 370/332 |
| 7,933,606 B2 * | 4/2011 | Frederiksen et al. | 455/450 |
| 7,986,672 B2 * | 7/2011 | Tiedemann et al. | 370/332 |
| 8,036,131 B2 * | 10/2011 | Roh et al. | 370/241 |
| 8,073,069 B2 * | 12/2011 | Mundarath et al. | 375/267 |
| 2003/0139989 A1 | 7/2003 | Churquina | |
| 2008/0080436 A1 * | 4/2008 | Sandhu et al. | 370/338 |
| 2011/0158123 A1 * | 6/2011 | Kim et al. | 370/252 |

FOREIGN PATENT DOCUMENTS

| | | |
|---|---|---|
| WO | 2004114549 A1 | 12/2004 |
| WO | 2009/027953 A2 | 3/2009 |
| WO | 2009027953 A3 | 5/2009 |

OTHER PUBLICATIONS

Cudak, Mark, "Draft IEEE 802.16m Requirements", IEEE 802.16 Broadband Wireless Access Working Group, Motorola (Mar. 15, 2007), pp. 1-34.

(Continued)

*Primary Examiner* — Dac Ha
(74) *Attorney, Agent, or Firm* — Brake Hughes Bellermann LLP (57) ABSTRACT

Various example embodiments are disclosed herein. According to one example embodiment, a method may include obtaining a first channel quality measurement for a wireless node such as a mobile station or relay station in a wireless network. The method may further include sending, from the wireless node, a full channel quality indicator (CQI) to a base station based on the first channel quality measurement. The method may further include obtaining a second channel quality measurement for the wireless node. The method may further include sending a differential CQI to the base station based on comparing the second channel quality measurement to the first channel quality measurement. The differential CQI may occupy less channel resources than the full CQI.

5 Claims, 7 Drawing Sheets

OTHER PUBLICATIONS

"Part 16 Air Interface for Fixed Broadband Wireless Access Systems", IEEE Standards for Local and Metropolitan Area Networks, IEEE std 802.16-2004 (Jun. 24, 2004), pp. 1 and 541-542.

"Part 16: Air Interface for Fixed and Mobile Broadband Wireless Access Systems, Amendment 2: Physical and Medium Access Control Layers for Combined Fixed and Mobile Operation in Licensed Bands and Corrigendum 1", IEEE Standard for Local and metropolitan area networks, IEEE Std. 802.16e-2005 and IEEE Std. 802.16-2004/Cor1-2005 (Feb. 28, 2006), pp. 439-448.

"Physical Layer Standard for cdma2000 Spread", 3G, Rivision D, 3rd Generation Partnership Project 2 "3GPP2", Version 2.0 (Sep. 2005), pp. 2-47 and 2-178 through 2-181.

"IEEE Standard for Information Technology—Telecommunications and information exchange between systems—Local and metropolitan area networks—Specific requirements", Part 11: Wireless LAN Medium Access Control (MAC) and Physical Layer (PHY) Specifications, IEEE Computer Society, IEEE Std. 802.11-2007, Jun. 12, 2007, 1231 pages.

Maheshwari, Shashikant, et al., "CQICH Reporting in Centralized Scheduling", NSN, IEEE 802.16 Broadband Wireless Access Working Group, IEEE C802.16j-07/490, Sep. 9, 2007, pp. 1-4.

Takatani, Yukihiro, et al., "A new metric for multi-hop path selection", IEEE 802.16 Presentation Submission Template (Rev. 8.3), IEEE S802.16j-07/079r1, Jan. 16, 2007, pp. 1-7.

"International Application Serial No. PCT/IB2008/053524, International Search Report and Written Opinion mailed on Feb. 12, 2009", P220,17 pgs.

"L1/L2 Signaling for Reporting Downlink Channel Quality Information", 3GPP TSG RAN WGI LTE Ad. HOC, R1-061775, Canes, France; Section 2, (Jun. 27-30, 2006).

"Scheduling and Multiplexing of COI,and ACK/NACK Feedback for Single Carrier FDMA in Evolved UTRA Uplink", 3GPP TSG Ran WGI LTE Ad. HOC Meeting #44bis, R1-060852, Athens , Greece. Section 2.1, (Mar. 27-31, 2006).

"Uplink Control Channels", IEEE 802.16 Broadband Wireless Access Working Group,Section 8.4.9; 8.4.9.3, (Mar. 11, 2004).

"Part 16: Air Interface for Fixed Broadband Wireless Access Systems", IEEE Standard for Local and Metropolitan area Networks, IEEE Computer Society and the IEEE Microwave Theory and Techniques Society, IEEE New York, NY IEEE Std., IEEE Std 802.16-2004, (Oct. 1, 2004),1-895.

Cudak, Mark "Draft IEEE 802.16m Requirements", IEEE C802.16m-07/002r1, IEEE 802.16 Broadband Wireless Access Working Group,(Mar. 15, 2007),1-34.

* cited by examiner

DIFFERENTIAL CHANNEL QUALITY REPORTING

PRIORITY CLAIM

This application claims priority based on U.S. Provisional Patent Application No. 60/969,469, filed on Aug. 31, 2007, entitled, "Differential Channel Quality Reporting," the disclosure of which is hereby incorporated by reference.

TECHNICAL FIELD

This description relates to wireless networks.

BACKGROUND

In wireless networks, stations may need to know the quality of channels through which data are sent. Stations, such as mobile stations or relay stations, may send channel quality indications to other stations, such as base stations.

SUMMARY

According to one example embodiment, a method may include obtaining a first channel quality measurement for a wireless node such as a mobile station or relay station in a wireless network. The method may further include sending, from the wireless node, a full channel quality indicator (CQI) to a base station based on the first channel quality measurement. The method may further include obtaining a second channel quality measurement for the wireless node. The method may further include sending a differential CQI to the base station based on comparing the second channel quality measurement to the first channel quality measurement. The differential CQI may occupy less channel resources than the full CQI.

According to another example embodiment, a method may include sending, from a base station in a wireless network, an instruction to a mobile station to send a full channel quality indicator (CQI) to the base station. The method may further include sending an instruction to the mobile station to send a differential CQI to the base station. The method may further include receiving the full CQI from the mobile station. The method may further include receiving the differential CQI from the mobile station. The differential CQI may occupy fewer channel resources than the full CQI.

According to another example embodiment, a wireless node, such as a mobile station, may include a controller. The mobile station may be configured to obtain a first channel quality measurement for the mobile station in a wireless network, send a full channel quality indicator (CQI) to a base station based on the first channel quality measurement, obtain a second channel quality measurement for the mobile station, and send a differential CQI to the base station based on comparing the second channel quality measurement to the first channel quality measurement. The differential CQI may occupy fewer channel resources than the full CQI.

According to another example embodiment, a base station may include a controller. The base station may be configured to send an instruction to a mobile station to send a full channel quality indicator (CQI) to the base station, send an instruction to the mobile station to send a differential CQI to the base station, receive the full CQI from the mobile station, and receive the differential CQI from the mobile station, the differential CQI occupying fewer channel resources than the full CQI.

According to another example embodiment, a method may include obtaining a first channel quality measurement for a mobile station in a wireless network, sending, from the mobile station, a full channel quality indicator (CQI) to a relay station based on the first channel quality measurement, obtaining a second channel quality measurement for the mobile station, and sending a differential CQI to the relay station based on comparing the second channel quality measurement to the first channel quality measurement, the differential CQI occupying less channel resources than the full CQI.

According to another example embodiment a method may include receiving, by a relay station, a first full channel quality measurement from a mobile station in a wireless network, sending, from the relay station, a full channel quality indicator (CQI) to a base station based on the first channel quality measurement, receiving a second full channel quality measurement from the mobile station, and sending a differential CQI to the base station based on comparing the second full channel quality measurement to the first full channel quality measurement, the differential CQI occupying less channel resources than the full CQI.

According to another example embodiment, a method may include receiving, by a relay station, a first full channel quality measurement from each of a plurality of mobile stations in a wireless network, sending, from the relay station, a full channel quality indicator (CQI) to a base station based on at least the first channel quality measurements, receiving a second full channel quality measurement from each of the plurality of mobile stations, determining a differential CQI at the relay station based on comparing the second full channel quality measurement to the first full channel quality measurement for each of the plurality of mobile stations, and sending the aggregated CQI report to the base station, the aggregated CQI report being based on the plurality of differential CQIs.

According to another example embodiment, a method may include determining, by a relay station, a differential channel quality indicator (CQI) for each of a plurality of mobile stations in a wireless network, and sending a codeword to a base station based on the plurality of differential CQIs.

According to another example embodiment, a method may include receiving, by a relay station, a differential channel quality indicator (CQI) from each of a plurality of mobile stations in a wireless network, and sending a codeword to a base station based on the plurality of differential CQIs.

According to another example embodiment, a method may include obtaining a first channel quality measurement for a relay station in a wireless network, sending, from the relay station, a full channel quality indicator (CQI) to a base station based on the first channel quality measurement, obtaining a second channel quality measurement for the relay station, and sending a differential CQI to the base station based on comparing the second channel quality measurement to the first channel quality measurement, the differential CQI occupying less channel resources than the full CQI.

The details of one or more implementations are set forth in the accompanying drawings and the description below. Other features will be apparent from the description and drawings, and from the claims.

DETAILED DESCRIPTION

Figure 1A:
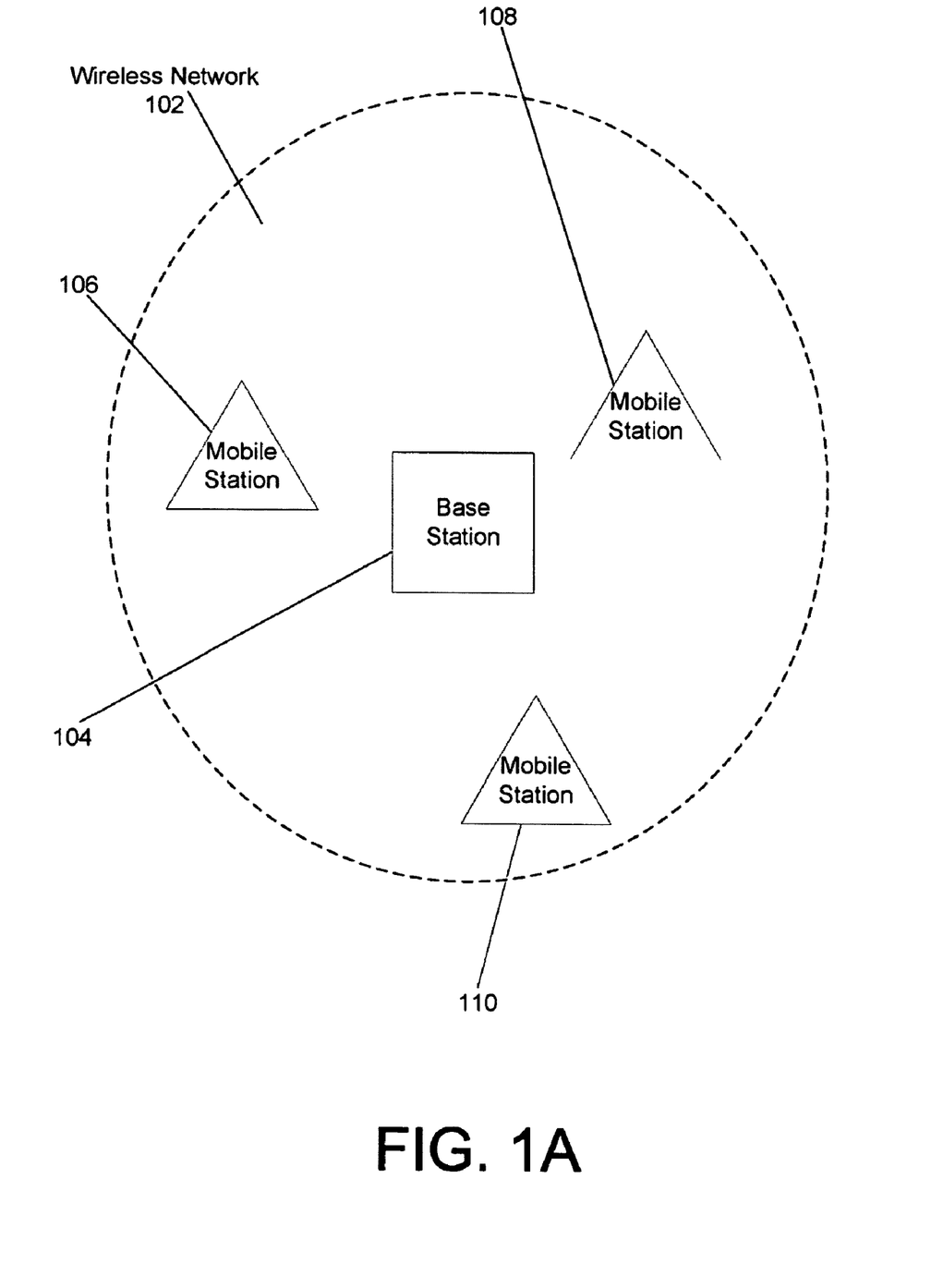
FIG. 1A is a block diagram of a wireless network including a base station and three mobile stations according to an example embodiment.

FIG. 1A is a block diagram of a wireless network 102 including a base station 104 and three mobile stations 106, 108, 110 according to an example embodiment. The wireless network 102 may include, for example, an IEEE 802.16 Wireless Metropolitan Area Network (WiMAX), an IEEE 802.11 Wireless Local Area Network (WLAN), or a cellular telephone network, according to example embodiments. The base station 104 may include a cellular or WiMAX base station, a node B, or an 802.11 access point, according to various example embodiments. The mobile stations 106, 108, 110 may include laptop or notebook computers, smartphones, personal digital assistants (PDAs), or cellular telephones, according to example embodiments. While the present disclosure utilizes the terminology of WiMAX, aspects of the present disclosure may be applicable to other wired or wireless technologies.

It may be desirable for the base station 104 to obtain channel quality information from one or more of the mobile stations 106, 108, 110. The base station 104 may, for example, send one or more instructions to one or more of the mobile nodes 106, 108, 110 to send a channel quality indicator (CQI) to the base station 104. The base station 104 may instruct the mobile nodes(s) 106, 108, 110 to send a full and/or differential CQI to the base station 104.

The mobile stations 106, 108, 110 may obtain channel quality measurements, such as a first channel quality measurement and a second channel quality measurement, for the respective mobile stations 106, 108, 110. The mobile stations 106, 108, 110 may obtain channel quality measurements by, for example, obtaining carrier-to-interference plus noise ratio (CINR) measurements such as physical CINR measurements, effective CINR measurements or multiple-input multiple-output (MIMO) feedback, precoding/channel matrix/ weight, signal strength, modulation and/or coding schemes, etc. The channel quality measurements may be reported using fast feedback channels, according to an example embodiment.

The channel quality measurements may be obtained based on message(s) received from the base station 104. For example, the channel quality may be measured based on an estimate of channel quality, such as the CINR, over subcarriers of a preamble of a message. In some examples, guard subcarriers and/or DC subcarriers may be excluded from the estimate. The CINR of a single message may be estimated by, for example, computing a ratio of a sum of signal power and a sum of residual error. A mean CINR, upon which the CQI may be based, may be derived from a multiplicity of single messages, such as by averaging the CINR of the messages, according to an example embodiment.

The CQI measurements may be reported to the base station 104 in units of decibels, according to an example embodiment. A full CQI may be an absolute value, independent of any other CQIs, which is based on a channel quality between the base station 104 and the mobile station 106 (further references to a single mobile station will be made to mobile station 106; however, unless otherwise stated, references to the mobile station 106 may be equally applicable to the mobile stations 108, 110).

Two examples are provided to calculate the differential CQIs. According to the first example, a differential CQI may be a relative value based on one or more previous measurements and CQIs; a first differential CQI sent after a full CQI may be based on comparing a second channel quality measurement to a first channel quality measurement, and subsequent differential CQIs may be based on comparing subsequent channel quality measurements to their preceding channel quality measurements. According to the second example, a differential CQI may be a relative value based on one or more previous measurements and CQIs; a first differential CQI sent after a full CQI may be based on comparing a second channel quality measurement to a first channel quality measurement, and subsequent differential CQIs may be based on comparing subsequent channel quality measurements to their preceding full channel quality measurement that was sent using full CQI channel.

For example, a full CQI may be followed by a number of differential CQIs. A first differential CQI may be, for example, +1, indicating that the channel quality is one unit (such as a decibel) higher than indicated by the full CQI. A second differential CQI may be, for example, +1, indicating that the channel quality is one unit higher than indicated by the first differential CQI or previous full CQI. A third differential CQI may be, for example, −1, indicating that the channel quality is one unit lower than indicated by the second differential CQI or previous full CQI, and so on. If the change in CQI is greater than the differential CQI quantization levels allow the mobile station 106 to report, the change may be reported in subsequent differential CQIs which "catch up" to the actual measured channel quality.

The CQIs may be sent to the base station 104 according to various communication schemes. For example, the mobile station 106 may use orthogonal frequency division multiplexing (OFDM) to send the CQIs to the base station 104.

According to one example, the mobile station 106 may send CQIs to the base station 104 via one or more CQI channels (CQICHs). According to an example embodiment, the CQICH may include a plurality of tiles, such as six tiles. In the example of six tiles in the CQICH, the tiles may be numbered from zero to five. A tile may include a plurality of orthogonally modulated quadrature phase-shift keying (QPSK) symbols, for example. Each tile may include eight data subcarriers which carry data signals and four pilot subcarriers, according to an example embodiment. The subcarriers may be adjacent and/or consecutive, according to an example embodiment. For example, a tile may include four adjacent subcarriers which may each include three consecutive orthogonal frequency division multiple access (OFDMA) symbols. The subcarriers in a tile may, in combination, represent any of eight symbols in an 8-ary alphabet, according to an example embodiment.

The symbols of the 8-ary alphabet of the tiles or vector indices shown in the left-hand side of the following table may each be formed by eight QPSK symbols, such as by the orthogonal modulation index shown in the right-hand side of the following table:

| Vector index | QPSK symbols |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

For example, the vector index "0" may be represented by the eight QPSK symbols "P0, P1, P2, P3, P0, P1, P2, P3". In an example embodiment, P0 may correspond to a forty-five degree phase shift, P1 may correspond to a one-hundred and thirty-five degree phase shift, P2 may correspond to a negative forty-five degree phase shift, and P3 may correspond to a negative one-hundred and thirty-five degree phase shift.

A combination of tiles may make up a tile combination vector. The tiles within a tile combination vector may be non-adjacent in the frequency spectrum, according to an example embodiment. A six-tile combination vector may, for example, include six tiles, with each tile having a value between zero and seven. A three-tile combination vector may include three such tiles, and a two-tile combination vector may include two such tiles.

According to an example embodiment, a CQICH or uplink (UL) OFDM slot may include six tiles. A full CQI may be sent via, for example, one CQICH or UL OFDM slot, and may include a six-tile combination vector. Multiple mobile stations may share an UL OFDM slot. Sharing may be implemented in the time, frequency or code multiplexing domain. Mobile stations may be assigned unique sets of codewords to represent full CQI and differential CQI reports. The CQICH or UL OFDM slot may represent a four-, five-, or six-bit message indicating the channel quality.

A differential CQI may be sent via, for example, one-half or one-third of a CQICH or UL OFDM slot, and may include a three- or two-tile combination vector, respectively. By using fewer tiles, the differential CQI may occupy fewer channel resources than the full CQI. This is merely an example. The differential CQI may occupy fewer channel resources than the full CQI in other example embodiments, such as by using a shorter time slot, a smaller frequency band, or an orthogonal codeword.

According to one example, a differential CQI may be sent via a differential fast feedback channel or differential CQICH channel with three-bit differential CQI parameter reporting. This example may use eight levels of quantization ranging from −4 to +3, with a three-tile combination vector allocated to each of two mobile stations 106, 108 which share one CQICH or UL OFDM slot. According to an example embodiment, one mobile station 106 may use even-numbered tiles to send its differential CQI, while the other mobile station 108 may use odd-numbered tiles to send its differential CQI. The eight quantization levels and corresponding tile vector indices of this example are shown in the following table:

| Differential fast feedback channel (differential CQICH channel) 3 bit differential CQI parameter reporting | Vector Indices per tile Tile(0), Tile (1), Tile(2) (in case ½ slot channel) Even = {Tile(0), Tile(2), Tile(4)} or Odd = {Tile(1), Tile(3), Tile(5)} (in case 1 slot channel) |
| --- | --- |
| +3 | 0 0 0 |
| +2 | 1 1 1 |
| +1 | 2 2 2 |
| 0 | 3 3 3 |
| −1 | 4 4 4 |
| −2 | 5 5 5 |
| −3 | 6 6 6 |
| −4 | 7 7 7 |

According to another example, the differential CQI may be sent via a differential fast feedback channel or differential CQICH channel with two-bit differential CQI parameter reporting. This example may use four levels of quantization ranging from −1 to +2, with a three-tile combination vector allocated to each of two mobile stations 106, 108 which share one CQICH or UL OFDM slot. According to an example embodiment, one mobile station 106 may use even-numbered tiles to send its differential CQI, while the other mobile station 108 may use odd-numbered tiles to send its differential CQI. The four quantization levels and corresponding tile vector indices of this example are shown in the following table:

| Differential fast feedback channel (differential CQICH channel) 2 bit differential CQI parameter reporting | Vector Indices per tile Tile(0), Tile (1), Tile(2) (in case ½ slot channel) Even = {Tile(0), Tile(2), Tile(4)} or Odd = {Tile(1), Tile(3), Tile(5)} (in case 1 slot channel) |
| --- | --- |
| +2 | 0 0 0 |
| +1 | 1 1 1 |
| 0 | 2 2 2 |
| −1 | 3 3 3 |

According to another example, the differential CQI may be also sent via a differential fast feedback channel or differential CQICH channel which may be shared by up to three mobile stations 106, 108, 110 with two-bit differential CQI parameter reporting. This example may use four levels of quantization ranging from −2 to +1, with a two-tile combination vector allocated to each of three mobile stations 106, 108, 110 which share one CQICH or UL OFDM slot. According to an example embodiment, the first mobile station 106 may use tiles zero and three to send its differential CQI, while the second mobile station 108 may use tiles one and four to send its differential CQI, and the third mobile station 110 may use tiles two and five to send its differential CQI. The four quantization levels and corresponding tile vector indices of this example are shown in the following table:

| Differential fast feedback channel (differential CQICH channel) 2 bit differential CQI parameter reporting | Vector Indices per tile 1st = {Tile(0), Tile(3)} or 2$^{nd}$ = {Tile(1), Tile(4)} 3$^{rd}$ = {Tile(2), Tile(5)} |
| --- | --- |
| +1 | 2 2 |
| 0 | 3 3 |
| −1 | 4 4 |
| −2 | 5 5 |

The mobile stations 106, 108, 110 may send the lull CQI(s) and/or the differential CQI(s) to the base station 104 periodically, according to an example embodiment. For example, the base station 104 may send a request to a mobile station 106 to send a full CQI to the base station 104 periodically, such as every second frame, every third frame, or every 'p'$^{th}$ frame (where 'p' represents the period), and may specify a duration for the periodic full CQIs. Similarly, the base station 104 may send a request to the mobile station 106 to send a differential CQI to the base station periodically, such as every 'p'$^{th}$ frame, and may specify a duration for the periodic differential CQIs. In an example embodiment, if a full CQI and a differential CQI overlap or are to be sent during the same frame, the mobile station 106 may ignore the differential CQI and send only the full CQI; in another example embodiment, the mobile station 106 may send both the full CQI and the differential CQI, and the base station 104 may process only the full CQI.

Figure 2:
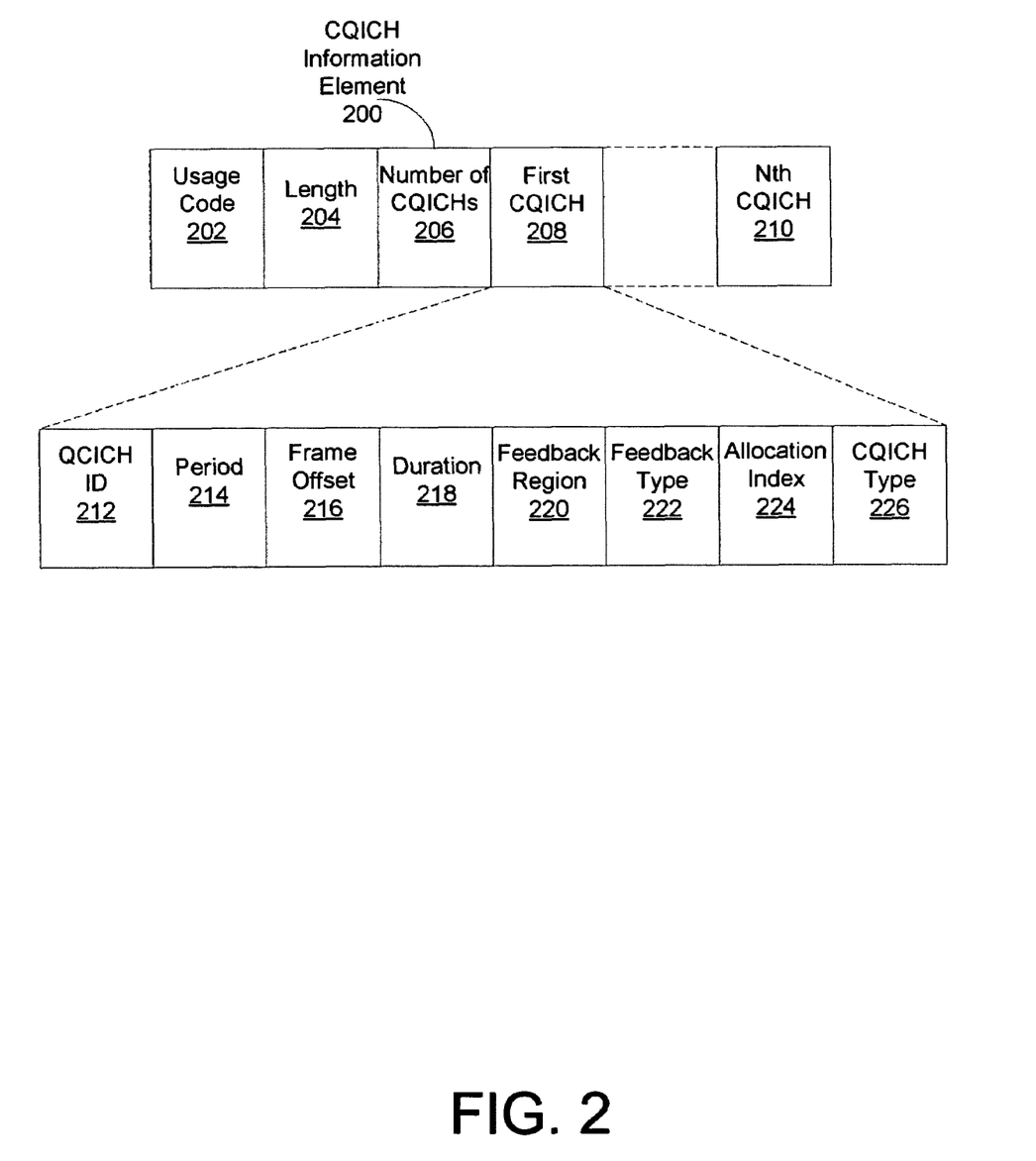
FIG. 2 is a block diagram of a channel quality indicator channel (CQICH) information element (IE) according to an example embodiment.

The mobile station 106 may send the full and/or differential CQI to the base station 104 in response to an instruction from the base station 104, such as an instruction included in a channel quality indicator channel (CQICH) information element (IE). FIG. 2 is a block diagram of a CQICH IE 200 according to an example embodiment. The base station 104 may send the CQICH IE 200 to a mobile station 106, according to an example embodiment. The CQICH IE 200 may include an instruction to the mobile station 106 to send a full CQI or a differential CQI to the base station 104.

The CQICH IE 200 may include a usage code field 202, according to an example embodiment. The usage code field 202 may include an extended-2 uplink internal usage code, according to an example embodiment. The usage code field 202 may indicate a burst profile, such as modulation and/or coding scheme, and/or transmission power, of a message which the CQICH IE 200 instructs the mobile station 106 to send to the base station 104.

The CQICH IE 200 may also include a length field 204. The length field 204 may indicate a total number of bytes in the remaining fields, according to an example embodiment. The CQICH IE 200 may also include a number of CQICHs field 206. The number of CQICHs field 206 may indicate a number of CQICHs which may be assigned by the CQICH IE 200. The number of CQICHs field 206 may indicate, for example, the total number of channels which may be assigned for transmission of CQIs, according to an example embodiment.

The CQICH IE 200 may include a number of CQICH fields indicated by the number of CQICHs field 206, such as a first CQICH field 208 through an Nth CQICH field 210, with N being equal to the number indicated in the number of CQICHs field 206.

Each CQICH field, such as the first CQICH field 208, may include a number of subfields. The first CQICH field 208 may include, for example, a CQICH ID subfield 212. The CQICH ID subfield 212 may identify the CQICH resources assigned to the first CQICH 208, such as one or more frequency bands and/or time slots. The first CQICH field 208 may also include a period subfield 214. The period subfield 214 may indicate a period for the first (or Nth) CQI (which may be a full or differential CQI, as discussed below). In one example, the CQI may be transmitted by the mobile station 106 every $2^p$ frames, where p may be a number indicated by the period subfield 214.

The first CQICH field 208 may also include a frame offset subfield 216. The frame offset field 216 may indicate a first frame in which the mobile station 106 should send a CQI. The mobile station 106 may, for example, send the CQI a number of frames after the current frame as indicated by the frame offset subfield 216. The first CQICH field 208 may also include a duration subfield 218, according to an example embodiment. The duration subfield 218 may indicate a duration over which the mobile station 106 should send CQIs. The duration subfield 218 may indicate a number of frames over which the mobile station 106 should send CQIs. For example, if the period subfield 214 indicates that the mobile station 106 should send CQIs every other frame, and the duration subfield 218 indicates that the mobile station 106 should send CQIs for forty frames, the mobile station 106 may send CQIs on the second frame, fourth frame, sixth frame, etcetera, through the fortieth frame.

The first CQICH field 208 may also include a feedback region subfield 220. The feedback region subfield 220 may indicate where the CQICH channel is allocated. For example, the feedback region subfield 220 may indicate whether the CQICH channel is allocated in a differential fast feedback region or in a fast feedback region. The first CQICH field 208 may also include a feedback type subfield 222. The feedback type subfield 222 may indicate a type of feedback for the mobile station 106 to send to the base station 104. For example, the feedback type subfield 222 may indicate whether the mobile station 106 should send a differential or full CQI. A full CQI may report an absolute value of the channel quality, whereas a differential CQI may report a change of channel quality from the previous CQI. In another example, the feedback type subfield 222 may indicate whether the mobile station 106 should send a fast downlink measurement, a quantized precoding weight feedback, an index to a precoding matrix in a codebook, channel matrix information, differential physical CINR feedback, or differential relative CINR feedback.

The first CQICH field 208 may also include an allocation index subfield 224. The allocation index subfield 224 may include an index to a feedback region indicated in the feedback region subfield 220. For example, the allocation index subfield 224 may indicate a portion of the feedback region, such as a particular CQICH channel or UL OFDM slot within the feedback region, in which the CQI or other feedback should be sent.

The first CQICH field 208 may also include a CQICH type subfield 226. The CQICH type subfield 226 may indicate a quantization level, and/or channel resources such as bits or tiles, for the feedback indicated by the feedback type subfield 222. For example, the CQICH type subfield 226 may indicate whether the base station should send a six-bit CQI, a three-bit CQI with four levels of quantization using even-numbered tiles, a three-bit CQI with four levels of quantization using odd-numbered tiles, a three-bit CQI with eight levels of quantization using even-numbered tiles, a three-bit CQI with eight levels of quantization using odd-numbered tiles, a primary six-bit CQI, a secondary four-bit CQI, a two-bit CQI using tiles zero and three, a two-bit CQI using tiles one and four, a two-bit CQI using tiles two and five, or a one-bit CQI using any of tiles zero through five.

According to an example embodiment, the CQICH IE 200 may be generated using the following syntax:

| Syntax | Size | Notes |
| --- | --- | --- |
| CQICH_Enhanced_feedback_IE( ) | — | — |
| { | | |
| Extended-2 | 4 bits | CQICH enhanced feedback IE = |

-continued

| Syntax | Size | Notes |
|---|---|---|
| UIUC | | TBD |
| Length | 8 bits | Length in bytes of following fields |
| CQICH_Num | 4 bits | Number of CQICHs assigned to this CQICH_ID may be (CQICH_Num +1) |
| For (j=0; j < CQICH_Num +1; j++) { | — | — |
| CQICH_ID | Variable | Index to uniquely identify the CQICH resources assigned to MS |
| Period (=p) | 3 bits | CQI feedback is transmitted on the assigned channel every $2^p$. |
| Frame offset | 3 bits | The MS may start reporting at the frame of which the number has the same 3 LSB as the specified frame offset. If the current frame is specified, the MS may start reporting in eight frames |
| Duration (=d) | 3 bits | A CQI feedback may be transmitted on the CQI channels indexed by the CQICH_ID for 10 × 2d frames. If d == 0b000, the CQICH may be de-allocated. If d == 0b111, the MS should report until the BS command for the MS to stop. |
| Feedback region | 2 bits | Indicate where this CQICH channel is allocated. 0b00 = allocated in differential fast feedback region 0b01 = allocated in fast feedback region |
| Feedback type | 4 bits | 0b0000-0b0010 = Fast DL measurement/Default Feedback depending on CQICH types 0b0011 = Quantized preceding weight feedback 0b0100 = Index to precoding matrix in codebook 0b0101 = Channel Matrix Information 0b0110 = differential physical CINR feedback 0b0111 = differential relative CINR feedback (more codes may be defined for differential feedback) 0b1000-0b1111 = Reserved |
| Allocation index | 6 bits | Index to the fast feedback region as specified above |
| CQICH type | 4 bits | 0b0000 = 6-bit CQI, 0b0001 = Reserved, 0b0010 = 3-bit CQI (even, 4 levels) 0b0011 = 3-bit CQI(odd, 4 levels) 0b0100 = 3-bit CQI (even, 8 levels) 0b0101 = 3-bit CQI(odd, 8 levels) 0b0110 = 6-bit CQI (primary) 0b0111 = 4-bit CQI (secondary) 0b1000 = 2 bit CQI (Tile 0, 3) 0b1001 = 2 bit CQI (Tile 1, 4) 0b1010 = 2 bit CQI (Tile 2, 5) 0b1011-0b1111 = Reserved (1 bit CQI may be defined for differential feedback) |
| } } | | |

In an example embodiment, a differential CQI may be aggregated into a channel with an acknowledgment (ACK), a negative acknowledgment (NAK), or an ACK/NAK. The differential CQI may be aggregated with an ACK/NAK into a channel such as an uplink (UL) ACK channel, according to an example embodiment; the full CQI may still be sent via a CQICH channel or UL OFDM slot. An UL ACK channel may include six tiles, with each tile including a plurality of orthogonally modulated QPSK symbols, similar to a CQICH or UL OFDM slot, according to an example embodiment. A mobile station 106 may be allocated one or a plurality of UL ACK channels per frame, according to example embodiments.

In an example embodiment in which an ACK/NAK utilizes three tiles or half of a CQICH or UL OFDM slot, the differential CQI may occupy the other three tiles or the other half of the CQICH or UL OFDM slot. For example, the ACK/NAK may be sent by the mobile station 106 to the base station 104 via the even-numbered tiles, and the differential CQI may be sent via the odd-numbered tiles, or vice versa.

In another example embodiment, the mobile station 106 may send a codeword to the base station 104. The codeword may indicate both the differential CQI and the ACK or NAK of a data burst. The codeword may, for example, be represented by a tile combination vector which indicates the differential CQI and the ACK or the NAK of the data burst. In this example, both the differential CQI and the ACK or NAK may utilize three tiles or occupy half of a CQICH or UL OFDM slot. An example of a set of three-tile combination vectors with three-bit reporting which reports one of four quantization levels, −2 to +1, and either ACK or NAK, is shown in the following table:

| Aggregated ACK channel and differential CQI parameter reporting (3 bit reporting) 1 bit report ACK/NAK and 2 bits may report differential CQI parameters. | Vector Indices per Tile Tile(0), Tile (1), Tile (2) |
|---|---|
| ACK and +1 (level) | 0 0 0 |
| ACK and 0 (level) | 1 1 1 |
| ACK and −1 (level) | 2 2 2 |
| ACK and −2 (level) | 3 3 3 |
| NAK and +1 (level) | 4 4 4 |
| NAK and 0 (level) | 5 5 5 |
| NAK and −1 (level) | 6 6 6 |
| NAK and −2 (level) | 7 7 7 |

Other example sets may utilize fewer codewords and/or fewer quantization levels, such as between −1 and +1.

The mobile station 106 may aggregate the differential CQI into the channel with the ACK/NAK based on receiving an instruction, such as an instruction included in a transmission schedule or a hybrid automatic repeat request (HARQ) subburst information element (IE) from the base station 104. The base station 104 may determine whether to instruct the mobile station 106 to aggregate the differential CQI with the ACK or NAK based, for example, on whether the base station 104 is sending data bursts or subbursts to the mobile station 106 frequently enough for all of the differential CQIs to be aggregated with ACKs or NAKs. Or, the base station 104 may instruct the mobile station 106 to aggregate some of the differential CQIs with the ACKs or NAKs, and to send some of the differential CQIs separately from ACKs or NAKs.

Figure 3:
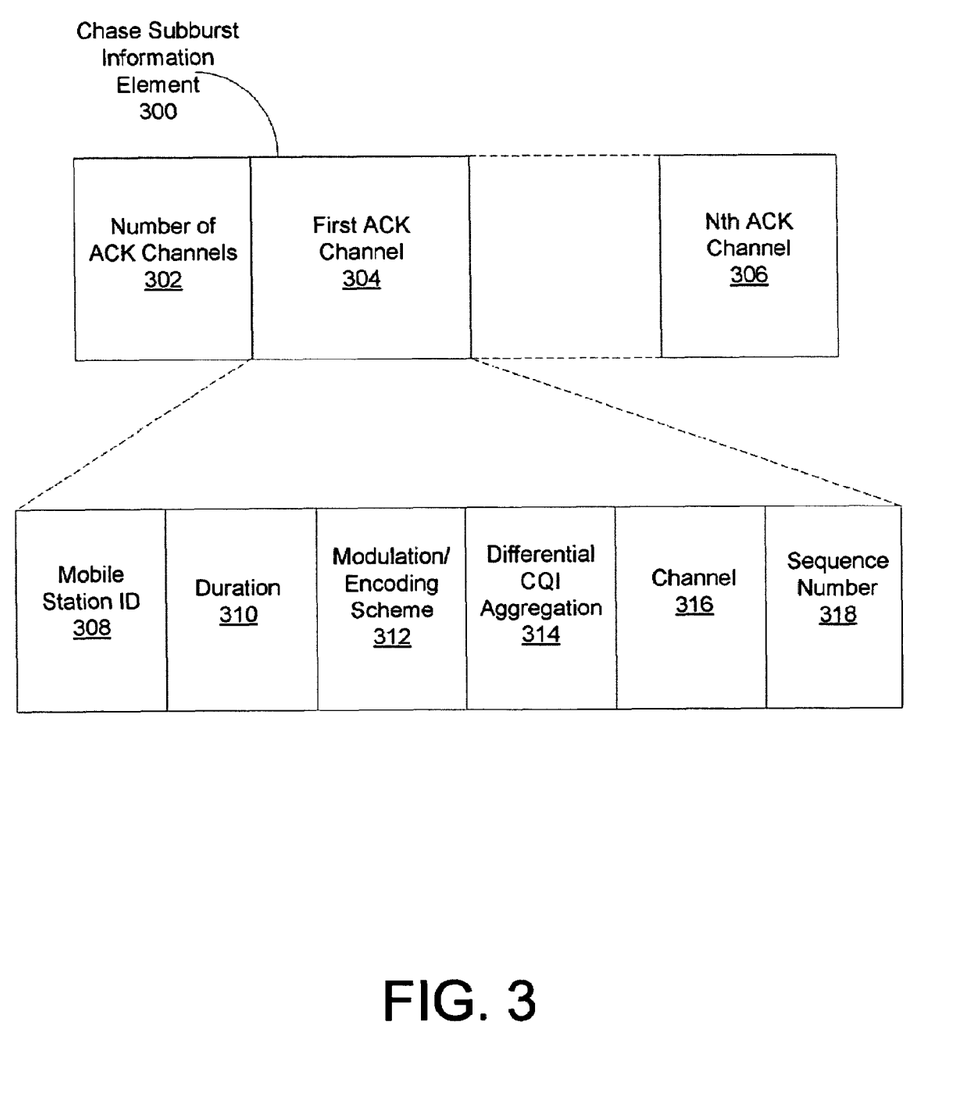
FIG. 3 is a block diagram of a chase subburst information element (IE) according to an example embodiment.

FIG. 3 is a block diagram of a HARQ chase subburst IE 300, which may include an instruction for the mobile station 106 to aggregate the differential CQI into a channel such as an ACK channel, according to an example embodiment. The HARQ chase subburst IE 300 may include, for example, a number of ACK channels field 302. The number of ACK channels field 302 may indicate a number of ACK channels which may be scheduled by the HARQ chase subburst IE 300. The number of ACK channels may correspond to a number of data bursts or subbursts which the base station 104 may send to the mobile station 106. The mobile station 106 may send either an ACK or a NAK through an ACK channel. The HARQ chase subburst IE 300 may also include a first ACK channel field 304 through an Nth ACK channel field 306, the number 'N' of ACK channel fields corresponding to the number indicated by the number of ACK channel field 302.

Each ACK channel field, such as the first ACK channel field 304, may include a number of subfields, such as a mobile station ID subfield 308. The mobile station ID field 308 may indicate the mobile station 106 to which the data subburst corresponding to the ACK channel will be sent, and which should send an ACK or a NAK along the ACK channel. The mobile station ID field 308 may, for example, include an address of the mobile station 106.

The first ACK channel field 304 may also include a duration subfield 310. The duration subfield 310 may indicate a duration of the data subburst corresponding to the ACK channel, such as in time slots, according to an example embodiment. According to another example embodiment, the duration subfield 310 may indicate the channel resources allocated to the data subburst, such as bandwidth and/or time.

The first ACK channel field 304 may also include a modulation/encoding scheme subfield 312. The modulation/encoding scheme subfield 312 may indicate a modulation scheme and/or a coding scheme which the base station 104 may use to transmit the data burst to the mobile station 106. The mobile station 106 may use the information in the modulation/encoding scheme subfield 312 to demodulate and/or decode the data subburst.

The first ACK channel field 304 may also include a differential CQI aggregation subfield 314. The differential CQI aggregation subfield 314 may indicate whether the mobile station 106 should aggregate, in the ACK channel, a differential CQI with an ACK or NAK which is sent in response to the data subburst. For example, the differential CQI aggregation subfield 314 may include an instruction, which may take the form of a single bit, to aggregate the differential CQI with the ACK or the NAK. The differential CQI may be aggregated with the ACK or NAK as described in paragraphs [0049] to [0051].

The first ACK channel field 304 may also include a channel subfield 316. The channel subfield 316 may indicate a channel via which the data subburst corresponding to the ACK channel may be sent. The mobile station 106 may have access to multiple, such as sixteen, logical channels, and the channel subfield 316 may identify the channel via which the data burst may be transmitted.

The first ACK channel field 304 may also include a sequence number subfield 318. The sequence number subfield 318 may indicate a sequence number for the data subburst corresponding to the ACK channel. The indicated sequence number may be included in the data subburst, and may be used to distinguish the data subburst from other data subbursts, and/or to place various data subbursts in the correct sequence.

According to an example embodiment, the base station 104 may generate the HARQ chase subburst IE according to the following syntax:

| Syntax | Size | Notes |
|---|---|---|
| DL HARQ Chase Subburst IE ( ) { | — | — |
| N ACK channel | 4 bits | Number of ACK channels or data subbursts |
| For (j = 0; j < N subburst; j++) { | — | — |
| RCID_IE( ) | Variable | Identity of mobile station |
|     Duration | 10 bits | Duration of data burst in slots |
|     Burst DIUC indicator [modulation/encoding scheme] | 1 bit | If Burst DIUC Indicator is 1, this may indicate that DIUC is explicitly assigned for this burst. Otherwise, this burst may use the same DIUC as the previous data burst. If j is 0, then this indicator may be 1. |
| Differential CQI and ACK/NAK aggregation | 1 bit | bit = 0, MS shall not perform aggregation, bit = 1, MS shall perform aggregation. May assume that differential CQICH channel is de-allocated, if previously allocated. |
|     If (burst DIUC indicator == 1) { | — | — |
|         DIUC | 4 bits | — |
|         Repetition coding indication | 2 bits | 0b00 - No repetition coding<br>0b01 - Repetition coding of 2 used<br>0b10 - Repetition coding of 4 used<br>0b11 - Repetition coding of 6 used |
|     } | | |
|     ACID | 4 bits | |
|     AI_SN | 1 bit | |
| } } } | | |

Figure 1B:
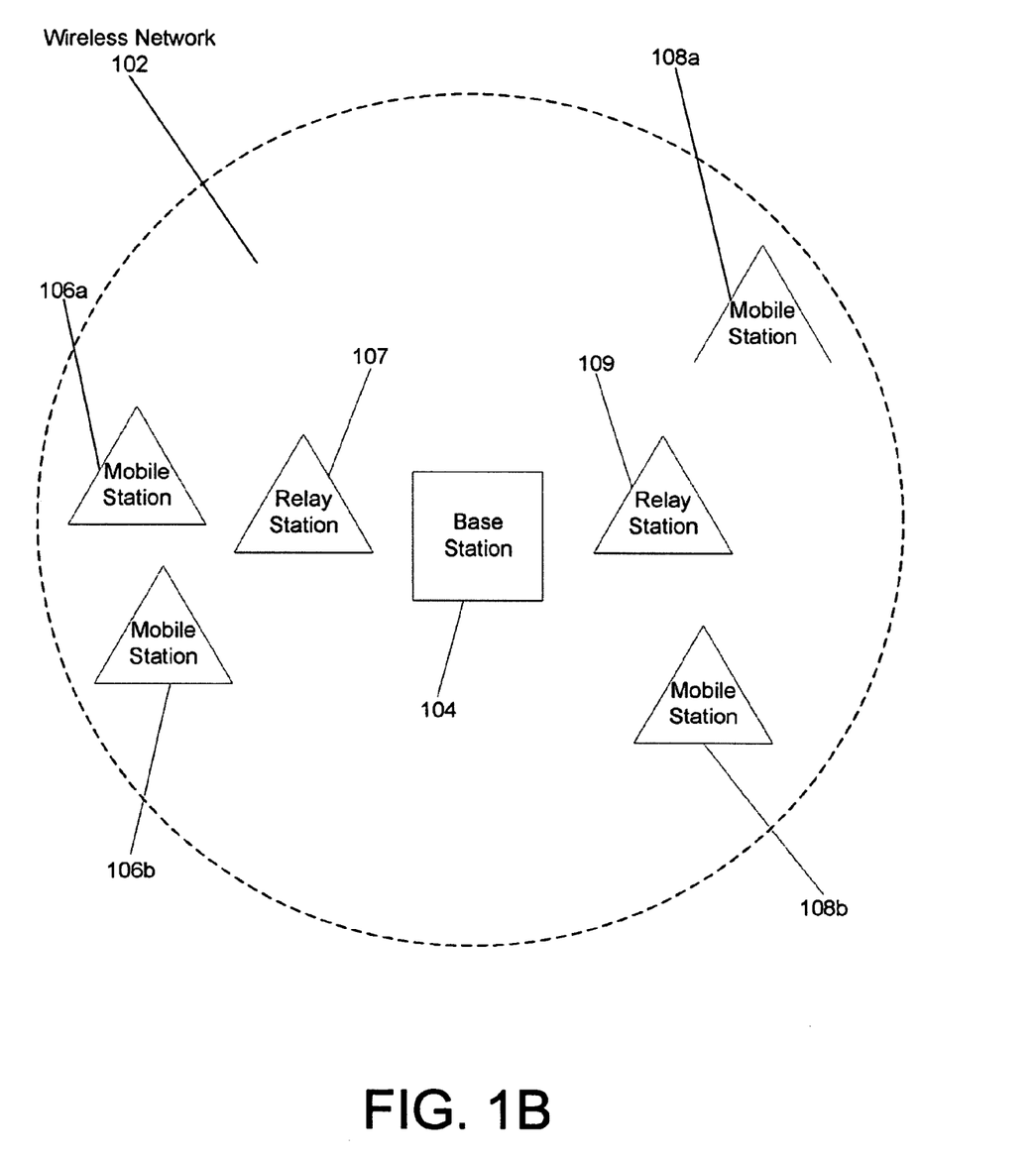
FIG. 1B is a block diagram of a wireless network including a base station, two relay stations, and two mobile stations associated with each relay station according to an example embodiment.

FIG. 1B is a block diagram of a wireless network 102 including a base station 104, two relay stations 107, 109, and two mobile stations 106a, 106b, 108a, 108b associated with each relay station 107, 109, according to an example embodiment. While FIG. 1B shows two mobile stations 106a, 106b, 108a, 108b associated with each relay station 107, 109, any number of mobile stations 106a, 106b, 108a, 108b may be associated with each relay station 107, 109. According to this example, the mobile stations 106a, 106b, 108a, 108b may send full CQI(s) and/or differential CQI(s) to the relay stations 107, 109. In an example embodiment, the relay stations 107, 109 may send full CQI(s) and/or differential CQI(s) to the base station 104. The differential CQI(s) sent by the relay stations 107, 109 to the base station 104 may be based on channel quality measured by the relay stations 107, 109, or may be based on CQI(s) sent from the mobile stations 106a, 106b, 108a, 108b. The CQI(s) may be similar to those described in paragraphs [0023] through [0037], for example.

In another embodiment, a relay station, for example relay station 107, may receive full CQI reports from a mobile station 106, generate differential CQIs based on the received full CQI reports, and send one or more differential CQIs to the parent station 104. Also, as mentioned with reference to another embodiment, the mobile station 106 may report the differential CQI directly to relay station 107. Subsequently, the relay station 107 may aggregate a plurality of differential CQI reports from different mobile stations 106a, 106b and send a codeword representing the aggregated report to the base station 104. For example, the relay station 107 may receive a differential channel quality indicator (CQI) from each of a plurality of mobile stations 106a, 106b in a wireless network 102, and send a codeword to the base station 104 based on the plurality of differential CQIs.

An example of the aggregation of the differential CQI reports for two mobile stations 106a, 106b using six tiles of the fast feedback channel with four quantization levels is presented in the following table:

| Aggregated differential CQI parameter reporting using codewords for two mobiles: 4 levels reporting for each mobile | Vector Indices per Tile (codewords) Tile(0), Tile (1), Tile (2), Tile (3), Tile (4), Tile (5) |
|---|---|
| +1 +1 | 0 0 0 0 0 0 |
| +1 0 | 1 1 1 1 1 1 |
| +1 −1 | 2 2 2 2 2 2 |
| +1 −2 | 3 3 3 3 3 3 |
| 0 +1 | 4 4 4 4 4 4 |
| 0 0 | 5 5 5 5 5 5 |
| 0 −1 | 6 6 6 6 6 6 |
| 0 −2 | 7 7 7 7 7 7 |
| −1 +1 | 0 1 2 3 4 5 |
| −1 0 | 1 2 3 4 5 6 |
| −1 −1 | 2 3 4 5 6 7 |
| −1 −2 | 3 4 5 6 7 0 |
| −2 +1 | 4 5 6 7 0 1 |
| −2 0 | 5 6 7 0 1 2 |
| −2 −1 | 6 7 0 1 2 3 |
| −2 −2 | 7 0 1 2 3 4 |

This is merely an example. Other similar table constructions may be used for different levels of quantization, number of mobile stations 106 that are aggregated, and/or number of tiles used.

The CQI(s) may be sent periodically, and/or in response to an instruction from the base station 104 or relay station 107, 109. The instructions for sending CQI(s) may be sent in a manner similar to that described in paragraphs [0038] through [0048]. The CQI(s) may also be aggregated into a channel with an ACK, NAK, or ACK/NAK, such as in a manner similar to that described in paragraphs [0049] through [0060], according to an example embodiment.

Figure 4:
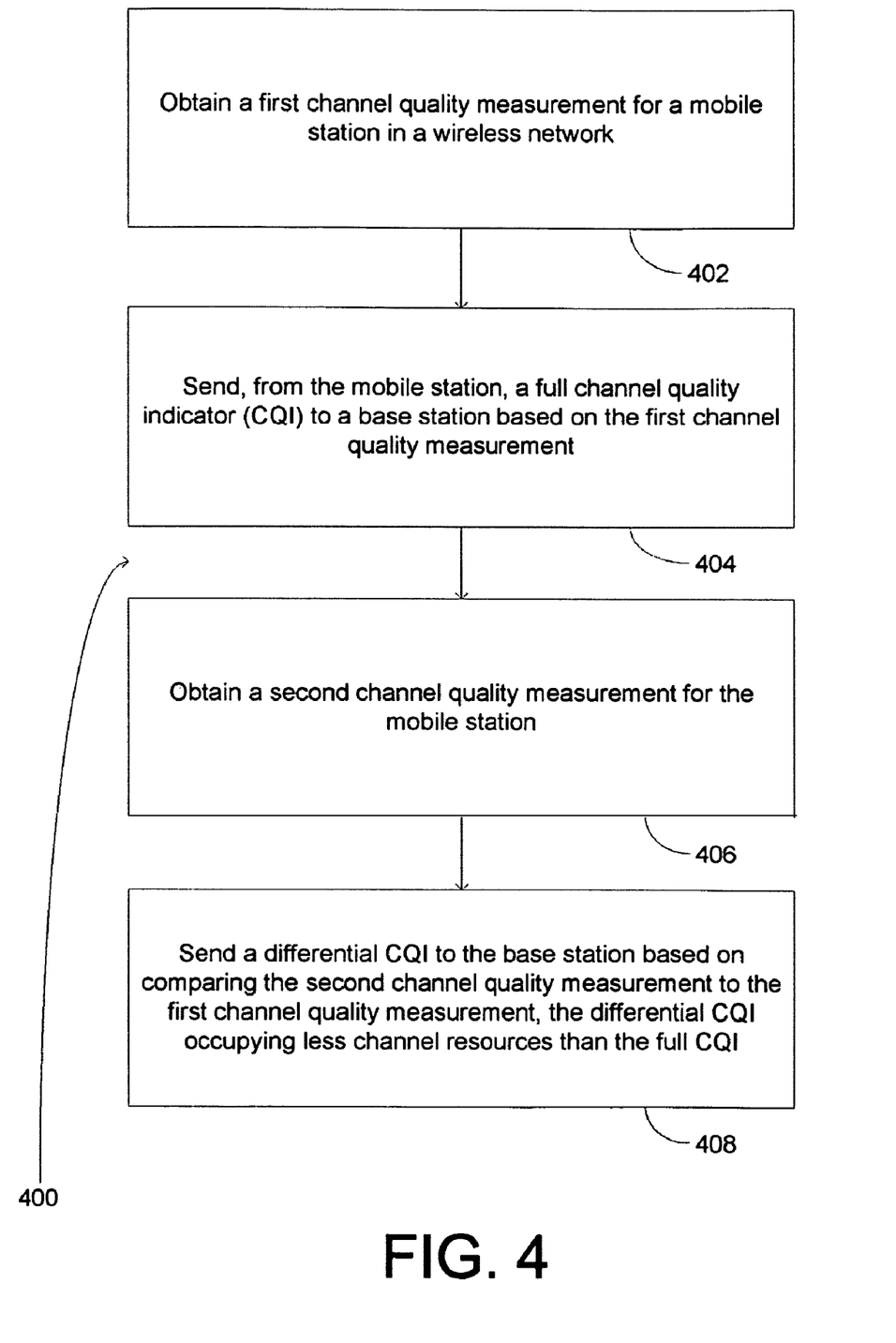
FIG. 4 is a flowchart of a method according to an example embodiment.

FIG. 4 is a flowchart of a method 400 according to an example embodiment. According to this example, the method 400 may include obtaining a first channel quality measurement for a mobile station 106 in a wireless network 102 (402). The method 400 may also include sending, from the mobile station 106, a full channel quality indicator (CQI) to a base station 104 based on the first channel quality measurement (404). The method 400 may further include obtaining a second channel quality measurement for the mobile station 106 (406). The method 400 may further include sending a differential CQI to the base station 104 (408). The differential CQI may be based on comparing the second channel quality measurement to the first channel quality measurement. In an example embodiment, the differential CQI may occupy less or fewer channel resources than the full CQI.

In an example embodiment, the obtaining the first channel quality measurement may include deriving a mean carrier-to-interference plus noise ratio (CINR) of a first plurality of messages. Also in this example, the obtaining the second channel quality measurement may include deriving a mean CINR of a second plurality of messages.

In another example embodiment, the full CQI may occupy one uplink orthogonal frequency division multiplexing (OFDM) slot.

In another example embodiment, the full CQI may occupy one channel quality indicator channel (CQICH).

In another example embodiment, the full CQI may include a six-tile combination vector.

In another example embodiment, the full CQI may be orthogonally modulated with quadrature phase-shift keying symbols.

In another example embodiment, sending the differential CQI to the base station 104 may include sending a plurality of differential CQIs to the base station 104 for every full CQI sent to the base station 104.

In another example embodiment, the differential CQI may include a three-tile combination vector.

In another example embodiment, the differential CQI may include a two-tile combination vector.

In another example embodiment, the differential CQI may be aggregated into a differential channel quality indicator channel (CQICH) channel with a differential CQI from another mobile station 108.

In another example embodiment, the differential CQI may be shared into a differential channel quality indicator channel (CQICH) channel with a differential CQI from one or more mobile stations 108, 110. The mobile stations 106, 108, 110 may be allocated unique codewords or tile combination vectors, according to example embodiments.

According to another example embodiment, the differential CQI may be aggregated into a differential channel quality indicator channel (CQICH) channel with two other differential CQIs from two other mobile stations 108, 110.

According to another example embodiment, sending the differential CQI to the base station 104 may include aggregating the differential CQI into a channel with an acknowledgment/negative acknowledgment (ACK/NAK).

According to another example embodiment, sending the differential CQI to the base station 104 may include aggregating the differential CQI into a channel with an acknowledgment/negative acknowledgment (ACK/NAK) based on receiving a chase burst information element (IE) from the base station 104.

According to another example embodiment, sending the differential CQI to the base station 104 may include sending a codeword to the base station 104. The codeword may indicate the differential CQI and an acknowledgment (ACK) or negative acknowledgment (NAK) of a data burst.

According to another example embodiment, sending the differential CQI to the base station 104 may include sending a tile combination vector to the base station 104. The tile combination vector may indicate the differential CQI and an acknowledgment (ACK) or negative acknowledgment (NAK) of a data burst.

According to another example embodiment, the method 400 may further include receiving a channel quality indicator channel (CQICH) information element (IE) including a feedback type from the base station 104. The feedback type may indicate the differential CQI. In this example, the differential CQI may be sent to the base station 104 in response to receiving the CQICH IE including the feedback type indicating the differential CQI.

According to another example embodiment, the method 400 may further include receiving, from the base station 104, a channel quality indicator channel (CQICH) information element (IE) including an allocation index. The allocation index may indicate a location of a CQICH within a feedback channel region.

According to another example embodiment, the method 400 may further include determining not to send a second differential CQI to the base station 104 based on the second differential CQI overlapping with a second full CQI.

Figure 5:
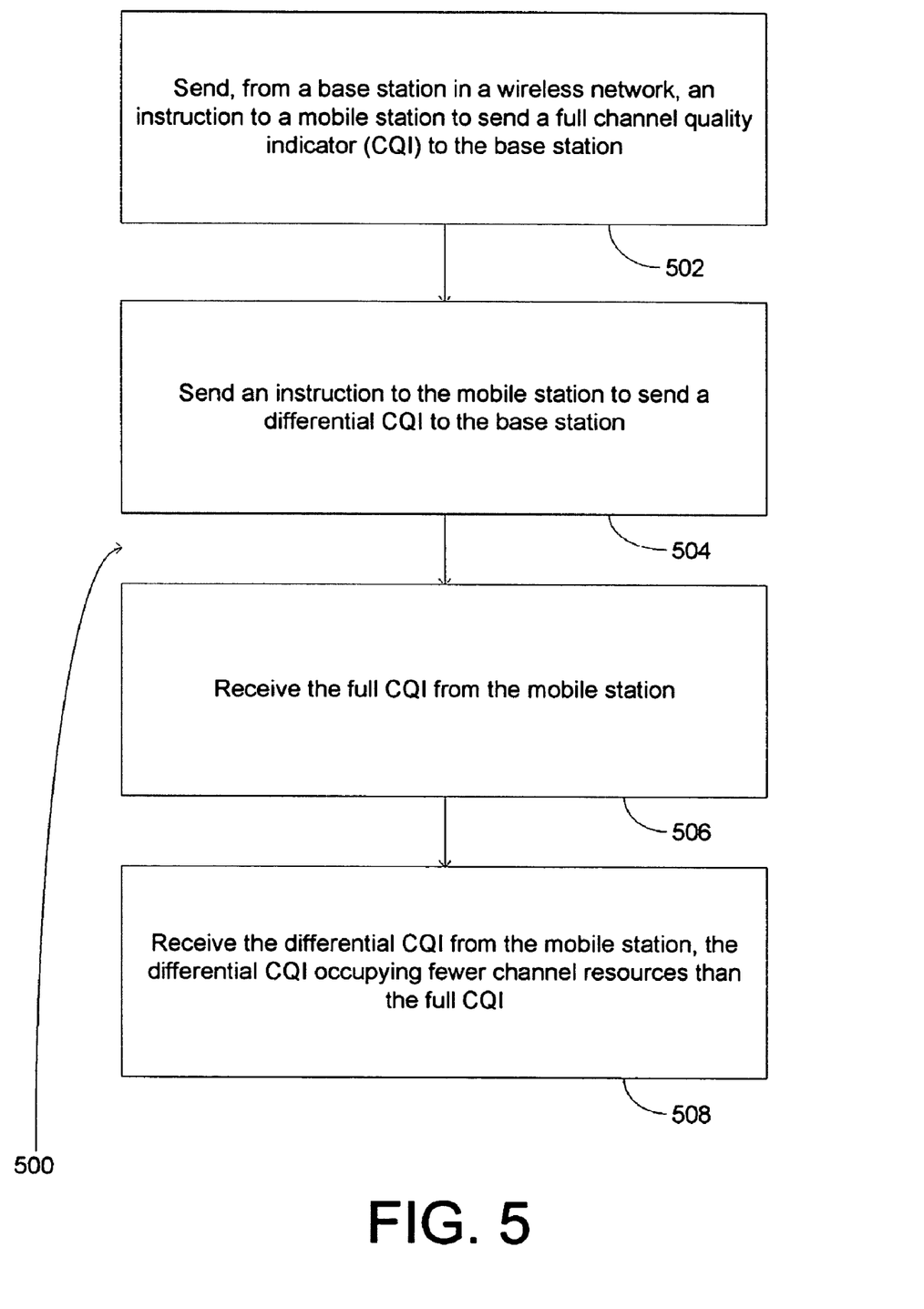
FIG. 5 is a flowchart of another method according to another example embodiment.

FIG. 5 is a flowchart of another method 500 according to another example embodiment. According to this example, the method 500 may include sending, from a base station 104 in a wireless network 102, an instruction to a mobile station 106 to send a full channel quality indicator (CQI) to the base station 104 (502). According to one example, the instruction to send the full CQI may be included in a channel quality indicator channel (CQICH) feedback information element (IE). According to another example, the instruction to send the full CQI may be included in a feedback type field of a channel quality indicator channel (CQICH) feedback information element (IE).

The method 500 may also include sending an instruction to the mobile station 106 to send a differential CQI to the base station 104 (504). According to one example embodiment, the instruction to send the differential CQI may be included in a channel quality indicator channel (CQICH) feedback information element (IE). According to another example embodiment, the instruction to send the differential CQI may be included in a feedback type field of a channel quality indicator channel (CQICH) feedback information element (IE). According to another example embodiment, the differential CQI may be included in a chase subburst information element.

The method 500 may further include receiving the full CQI from the mobile station 106 (506). According to one example embodiment, the full CQI may include a six-tile vector combination.

The method 500 may further include receiving the differential CQI from the mobile station 106 (508). The differential CQI may occupy fewer channel resources than the full CQI. According to one example embodiment, receiving the differential CQI may include receiving one differential CQI from each of two mobile stations 106, 108. In this example, each differential CQI may include three tiles of a six-tile differential channel quality indicator channel (CQICH) channel. According to another example embodiment, receiving the differential CQI may include receiving one differential CQI from each of two mobile stations 106a, 106b. In this example, each differential CQI may share three tiles of a six-tile differential channel quality indicator channel (CQICH) channel. The mobile stations 106a, 106b may each be allocated a unique codeword for reporting full or differential CQI reports.

According to another example embodiment, receiving the differential CQI may include receiving one differential CQI from each of three mobile stations 106, 108, 110. In this example, each differential CQI may include two tiles of a six-tile differential channel quality indicator channel (CQICH) channel. According to another example embodiment, receiving the differential CQI may include receiving one differential CQI from each of three mobile stations 106, 108, 110. In this example, each differential CQI may share two tiles of a six-tile differential channel quality indicator channel (CQICH) channel. The mobile stations 106, 108, 110 may each be allocated a unique codeword for reporting full or differential CQI reports. According to another example embodiment, receiving the differential or full CQI may include receiving one differential or full CQI from one or more mobile stations 106, 108, 110. In this example, each differential or full CQI may share a six-tile differential channel quality indicator channel (CQICH) channel. The mobile stations 106, 108, 110 may each be allocated a unique codeword for reporting differential/full CQI reports.

According to another example embodiment, the method 500 may further include determining to instruct the mobile station 106 to aggregate the differential CQI with an acknowledgment (ACK) or negative acknowledgment (NAK). In this example, the differential CQI received from the mobile station 106 may be aggregated with the ACK or NAK into a single channel.

Figure 6:
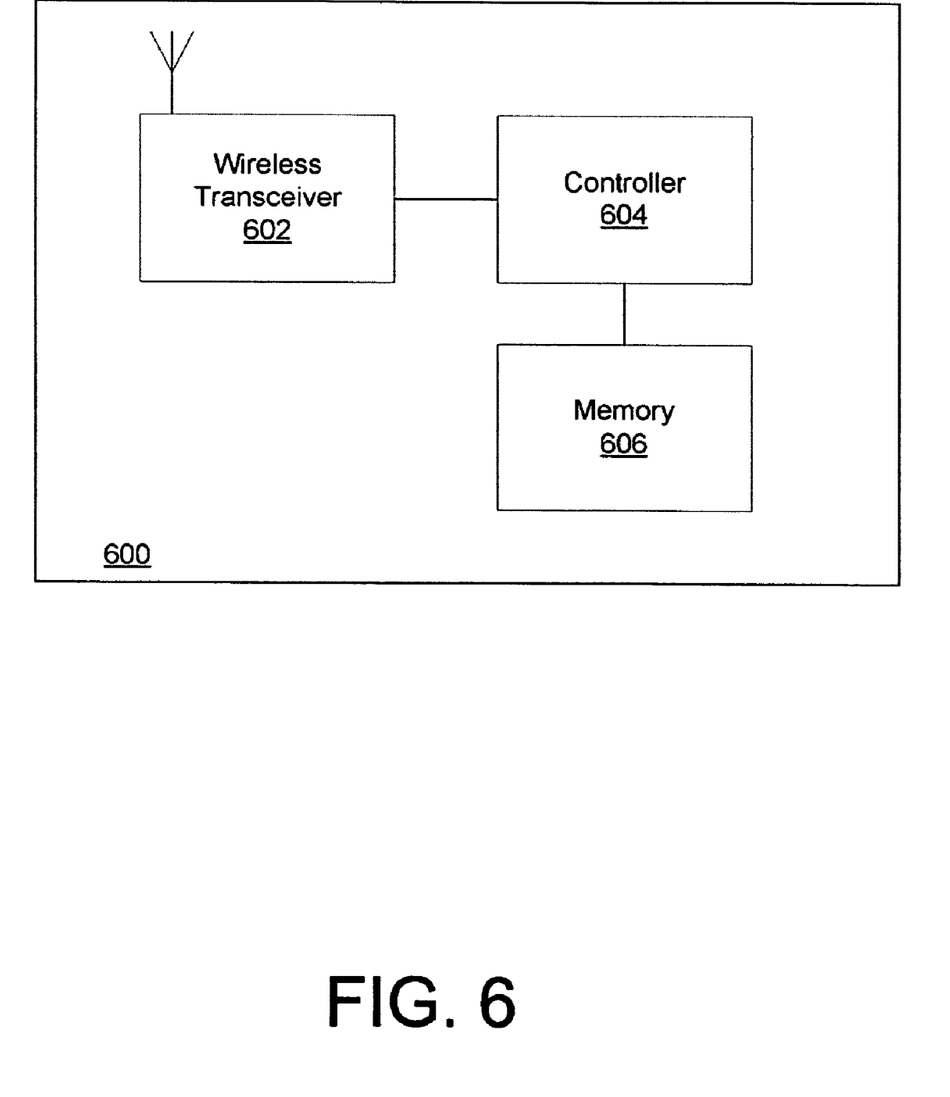
FIG. 6 is a block diagram of a wireless station according to an example embodiment.

FIG. 6 is a block diagram of a wireless station 600 according to an example embodiment. The wireless station 600 (e.g. base station 104 or mobile node 106, 108, 110) may include, for example, a wireless transceiver 602 to transmit and receive signals, a controller 604 to control operation of the station and execute instructions or software, and a memory 606 to store data and/or instructions.

Controller 604 may be programmable and capable of executing software or other instructions stored in memory or on other computer media to perform the various tasks and functions described above, such as one or more of the tasks or methods described above.

In addition, a storage medium may be provided that includes stored instructions, which when executed by a controller or processor may result in the controller 604, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
receiving, by a relay station, a first full channel quality measurement from a mobile station in a wireless network;
sending, from the relay station, a full channel quality indicator (CQI) to a base station based on the first channel quality measurement;
receiving a second full channel quality measurement from the mobile station; and
sending a differential CQI to the base station based on comparing the second full channel quality measurement to the first full channel quality measurement, the differential CQI occupying less channel resources than the full CQI.

2. A method comprising:
receiving, by a relay station, a first full channel quality measurement from each of a plurality of mobile stations in a wireless network;
sending, from the relay station, a full channel quality indicator (CQI) to a base station based on at least the first channel quality measurements;
receiving a second full channel quality measurement from each of the plurality of mobile stations;
determining a differential CQI at the relay station based on comparing the second full channel quality measurement to the first full channel quality measurement for each of the plurality of mobile stations; and
sending an aggregated CQI report to the base station, the aggregated CQI report being based on the plurality of differential CQIs.

3. A relay station comprising:
a controller;
the relay station being configured to:
receive a first full channel quality measurement from a mobile station in a wireless network;
send a full channel quality indicator (CQI) to a base station based on the first channel quality measurement;
receive a second full channel quality measurement from the mobile station; and
send a differential CQI to the base station based on comparing the second full channel quality measurement to the first full channel quality measurement, the differential CQI occupying less channel resources than the full CQI.

4. A relay station comprising:
a controller;
the relay station being configured to:
receive a first full channel quality measurement from each of a plurality of mobile stations in a wireless network;
send a full channel quality indicator (CQI) to a base station based on at least the first channel quality measurements;
receive a second full channel quality measurement from each of the plurality of mobile stations;
determine a differential CQI at the relay station based on comparing the second full channel quality measurement to the first full channel quality measurement for each of the plurality of mobile stations; and
send an aggregated CQI report to the base station, the aggregated CQI report being based on the plurality of differential CQIs.

5. A relay station comprising:
a controller;
the relay station being configured to:
obtain a first channel quality measurement for the relay station in a wireless network;
send a full channel quality indicator (CQI) to a base station based on the first channel quality measurement;
obtain a second channel quality measurement for the relay station; and
send a differential CQI to the base station based on comparing the second channel quality measurement to the first channel quality measurement, the differential CQI occupying less channel resources than the full CQI.

* * * * *